(12) United States Patent
Clark

(10) Patent No.: US 6,796,615 B1
(45) Date of Patent: Sep. 28, 2004

(54) BOTTOM DUMP FARM CART

(76) Inventor: Garry R. Clark, 4349 Studley Rd., Mechanicsville, VA (US) 23116

( * ) Notice: Subject to any disclaimer, the term of this patent is extended or adjusted under 35 U.S.C. 154(b) by 0 days.

(21) Appl. No.: 10/455,157

(22) Filed: Jun. 6, 2003

(51) Int. Cl.[7] .............................. B60P 1/56; B61D 3/04; B61D 7/02
(52) U.S. Cl. .......................... 298/29; 298/31; 298/35 R; 296/25; 414/469
(58) Field of Search ........................... 296/25, 56, 180, 296/183.2, 146.1, 147, 184; 298/24, 25, 27, 29, 31, 32, 33, 35 R, 37, 38, 1 B; 414/467, 469, 520

(56) References Cited

U.S. PATENT DOCUMENTS

| | | | | |
|---|---|---|---|---|
| 764,319 | A | * | 7/1904 | Tripp ........................ 298/35 R |
| 1,002,174 | A | * | 8/1911 | O'Brien ..................... 298/35 R |
| 1,064,448 | A | * | 6/1913 | Daniels ......................... 298/33 |
| 1,540,812 | A | * | 6/1925 | Smalley ..................... 298/35 R |
| 1,613,458 | A | * | 1/1927 | Heffernan ................... 188/82.3 |
| 2,102,676 | A | * | 12/1937 | Byington ................... 298/35 R |
| 3,183,852 | A |   | 5/1965 | Fritz |
| 3,558,190 | A |   | 1/1971 | Peterson et al. |
| 3,698,767 | A |   | 10/1972 | Hanson |
| 3,917,084 | A |   | 11/1975 | Swisher, Jr. et al. |
| 4,348,047 | A |   | 9/1982 | Harshman |
| 4,362,457 | A |   | 12/1982 | Taylor et al. |
| 6,386,818 | B1 |   | 5/2002 | Reed |
| 6,705,681 | B2 | * | 3/2004 | Russ ........................... 298/29 |

* cited by examiner

Primary Examiner—D. Glenn Dayoan
Assistant Examiner—H. Gutman
(74) Attorney, Agent, or Firm—Norman B. Rainer

(57) ABSTRACT

A bottom dump trailer cart which includes a wheeled cargo compartment having a floor equipped with downwardly pivoting dumping panels is constructed such that the panels protect the wheels from the dumped cargo. The cart is capable of riding over the dumped cargo because of the absence of an axle connecting wheels on opposite sides of the cart, and the provision of a rear wall of the compartment which can be caused to pivot upwardly and rearwardly. A tongue assembly extends forwardly of the cargo compartment. An operating mechanism positioned above the tongue assembly enables conversion between a dumping state wherein the dumping panels and rear wall are caused to be free-swinging, and a locked transport state wherein the dumping panels are secured in horizontal position and the rear wall is secured in a vertical position.

8 Claims, 3 Drawing Sheets

BOTTOM DUMP FARM CART

BACKGROUND OF THE INVENTION

1. Field of the Invention

This invention relates to a wheeled cargo-carrying vehicle, and more particularly concerns a trailer adapted to dump its cargo downwardly upon the ground in a single discharge.

2. Description of the Prior Art

Bottom dump vehicles or wagons are frequently used to transport a variety of dense bulk materials such as sand, gravel, salt, hot mix asphalt, coal, ores, and the like. One primary advantage of a bottom dump trailer or truck as opposed to a conventional hydraulic hoist dump truck is that there is no need for vertical elevation to discharge the cargo rearwardly. As such, bottom dump vehicles do not have the risks associated with conventional hydraulic hoist dump trucks such as interference with low electrical or telephone wires and the potential for tipping over due to vertical elevation of a hoisted cargo compartment, Another advantage is that bottom dump vehicles do not require expensive and failure-prone hydraulic systems employed in rear-dump hauling vehicles.

U.S. Pat. Nos. 3,183,852 and 3,558,190 disclose hopper cars having horizontally slideable gates or doors to control downward discharge of the contents of the hopper in order to produce an elongated windrow instead of a single large pile. One of the problems encountered with a single large pile is that the rear wheels of the vehicle ride on the sides of the pile, resulting in considerable damage to the sidewalls of the tires on said rear heels. Also, the pile will impact against an axle associated with the rear wheels. Said sliding doors require expensive heavy duty motors for operation, and the doors are subject to rapid wear due to friction created by sliding interaction with the cargo material.

U.S. Pat. No. 6,386,818 to Reed and U.S. Pat. No. 3,917,084 to Swisher, et. al., disclose "live bottom" trailers which employ a horizontally oriented conveyor belt at the bottom of a cargo compartment to move the cargo rearwardly for controlled dumping to produce an elongated windrow.

Bottom dumping vehicles designed to discharge in a single dump of farm products such cotton and hay are disclosed in U.S. Pat. Nos. 4,362,457 and 3,698,767, respectively. However, said vehicles are designed to discharge their loads as integrated or shaped structures, and do not confront the need to travel over the discharged load.

It is accordingly an object of the present invention to provide a farm trailer cart that can dump a loose bulk cargo downwardly upon the ground in a single discharge pile and then be pulled over and away from said pile.

It is another object of this invention to provide a cart as in the foregoing object of simple, rugged construction amenable to low cost manufacture.

These objects and other objects and advantages of the invention will be apparent from the following description.

SUMMARY OF THE INVENTION

The above and other beneficial objects and advantages are accomplished in accordance with the present invention by a bottom dump trailer cart comprising:

a) a cargo compartment defined by a front wall, paired sidewalls, a rear wall adapted to swing rearwardly and upwardly, and a floor having a pair of pivotably supported dumping panels adapted to swing downwardly in the direction of said sidewalls to a dumping state which permits gravity discharge of the contents of the compartment, b) latching means for controllably preventing movement of said rear wall, c) at least one wheel positioned below each sidewall at a location that receives said panels in the dumping state, d) a tongue assembly extending forwardly of said front wall and having means for releasable attachment to a towing vehicle, and e) operating means associated with said tongue assembly for causing simultaneous movement of said panels and latching means to produce said dumping state wherein said rear wall is unlatched, and to produce a closed, transport state wherein said panels are upwardly drawn to inter-contacting abutment, and said rear wall is secured in upright position by said latching means.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
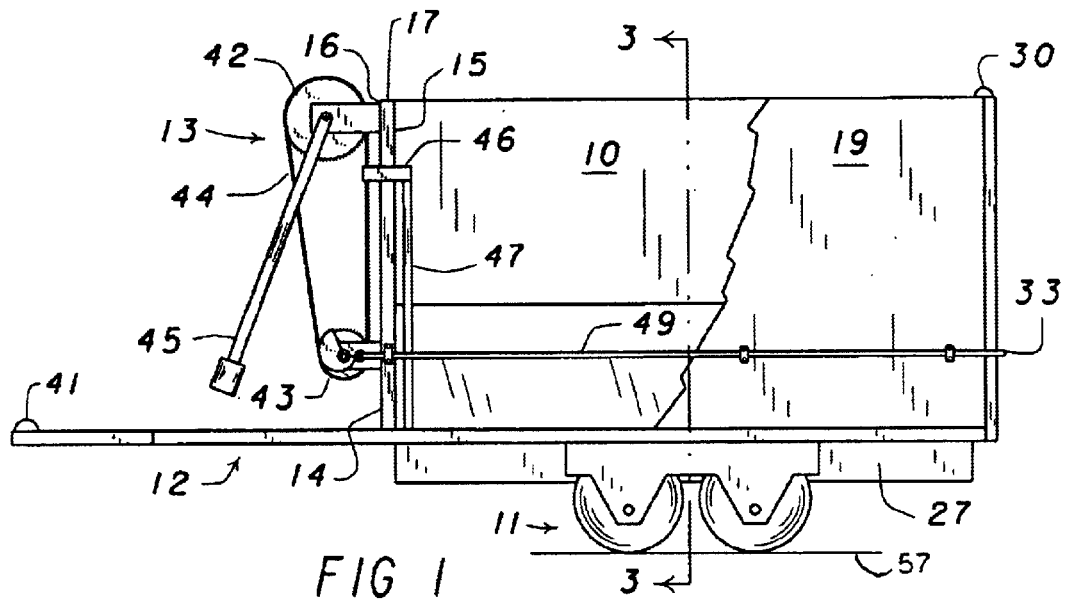
FIG. 1 is a side view of an embodiment of the cart of this invention shown with portions broken away and shown in the transport state of operation.

Referring now to FIGS. 1–8, an embodiment of the farm cart of the present invention is shown comprised of cargo compartment 10, tandem wheels 11 positioned below said cargo compartment on each side thereof, a tongue assembly 12 extending forwardly of said cargo compartment, and operating means 13 associated with said tongue assembly.

Cargo compartment 10 is comprised of front wall 14 having interior and exterior surfaces 15 and 16, respectively, and upper and lower extremities 17 and 18, respectively; opposed sidewalls 19, joined to front wall 14 in spaced apart relationship about longitudinal axis 20 and bounded in part by lower borders. 21, and upper borders 22 which are straight, parallel, and horizontally coplanar. Said sidewalls extend to rear extremities 23. A rear wall 29 is supported by pivot means 30 associated with the upper borders 22 of said sidewalls adjacent rear extremities 23, and is capable of swinging movement rearwardly and upwardly.

Figure 3:
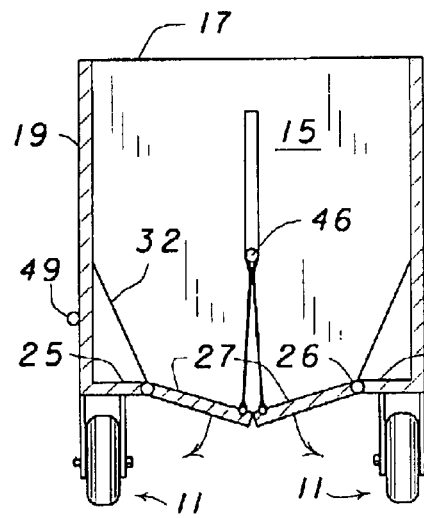
FIG. 3 is a sectional view taken in the direction of the arrows upon the line 3—3 of FIG. 1.
Figure 4:
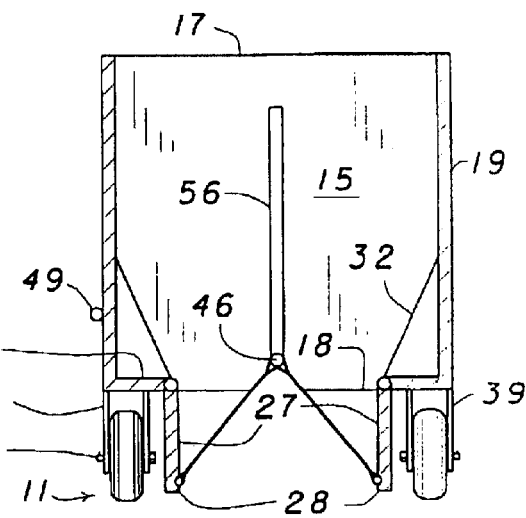
FIG. 4 is a sectional view taken in the direction of the arrows upon the line 4—4 of FIG. 2.
Figure 5:
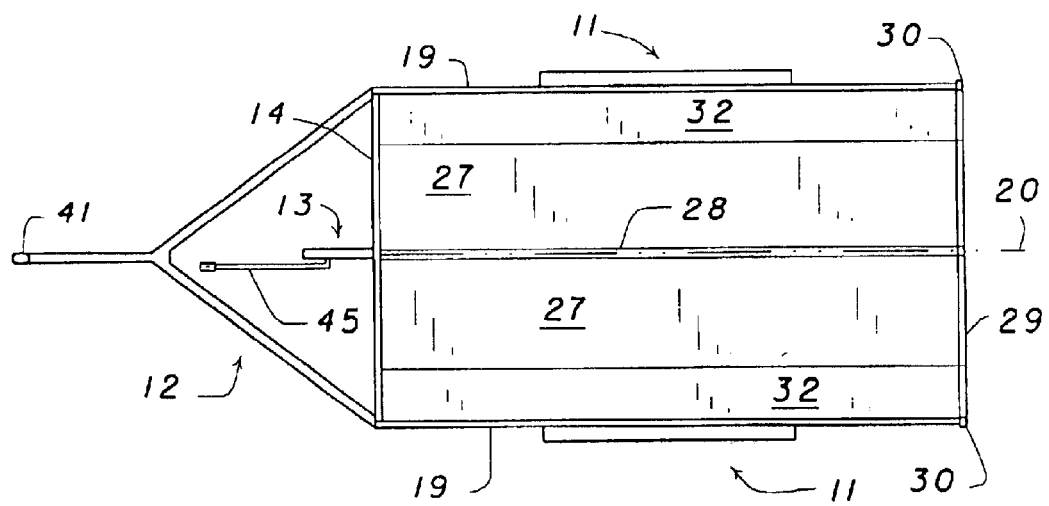
FIG. 5 is a top view of the embodiment of FIG. 1.
Figure 6:
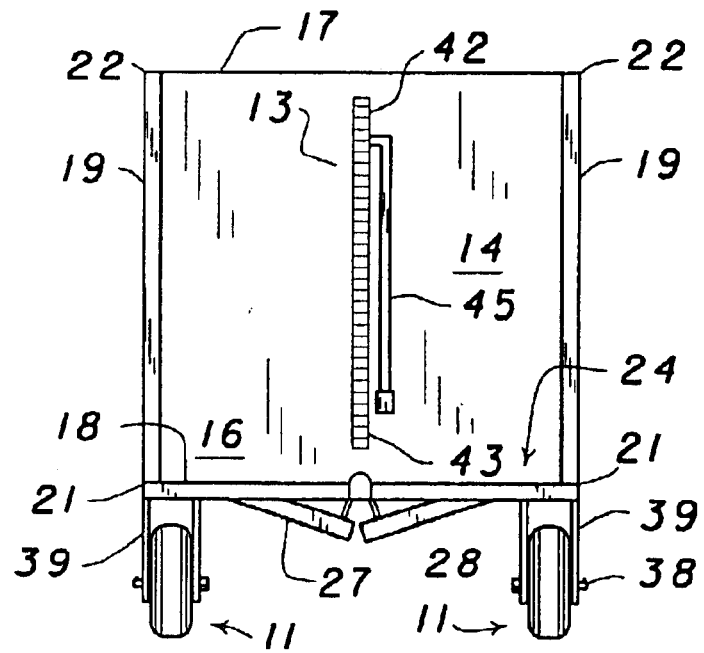
FIG. 6 is a front view of the embodiment of FIG. 1.
Figure 7:
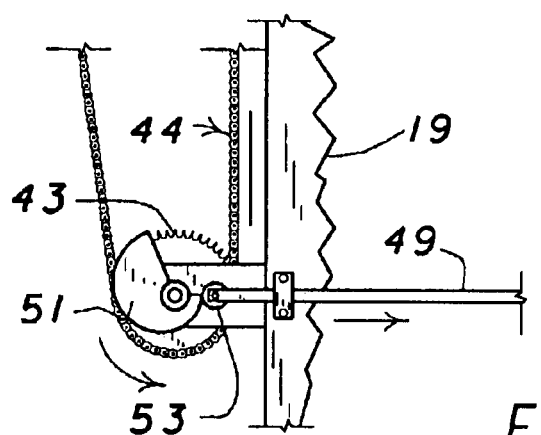
FIG. 7 is a fragmentary schematic side view showing the operating mechanism of the cart of FIG. 1.
Figure 7:
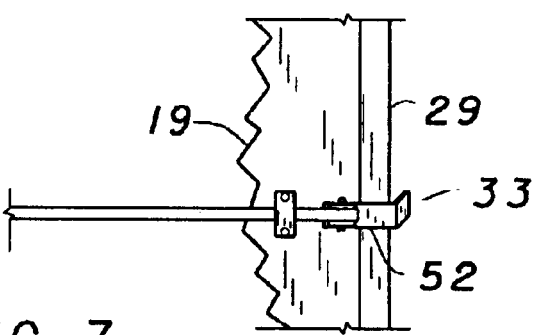
Figure 8:
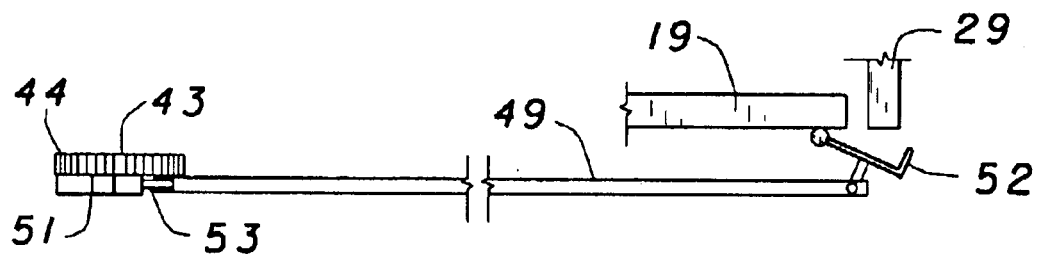
FIG. 8 is a top view of the schematic view of FIG. 7.

A floor 24 is comprised of opposed outer horizontal segments 25 terminating in interior straight edges 26, and a pair of dumping panels 27 pivotably supported by edges 26, and extending to straight distal extremities 28. Said dumping panels are adapted to swing toward and away from each other in a path orthogonal to axis 20. A non-dumping or closed transport state is achieved when said distal extremities are in contacting abutment, as best shown in FIG. 3. A dumping state is achieved when panels 27 are separated and downwardly directed, as best shown in FIG. 4.

To facilitate complete dumping of the contents of the cargo compartment, inclined bed liner panels 32 may be associated with floor 24 in downwardly convergent juxtaposition.

Latching means 33 are interactive with rear wall 29 in a manner to secure said rear wall in upright position in abutment with the rear extremities 23 of said sidewalls and the rear extremity of floor 24, thereby closing said cargo compartment.

Figure 2:
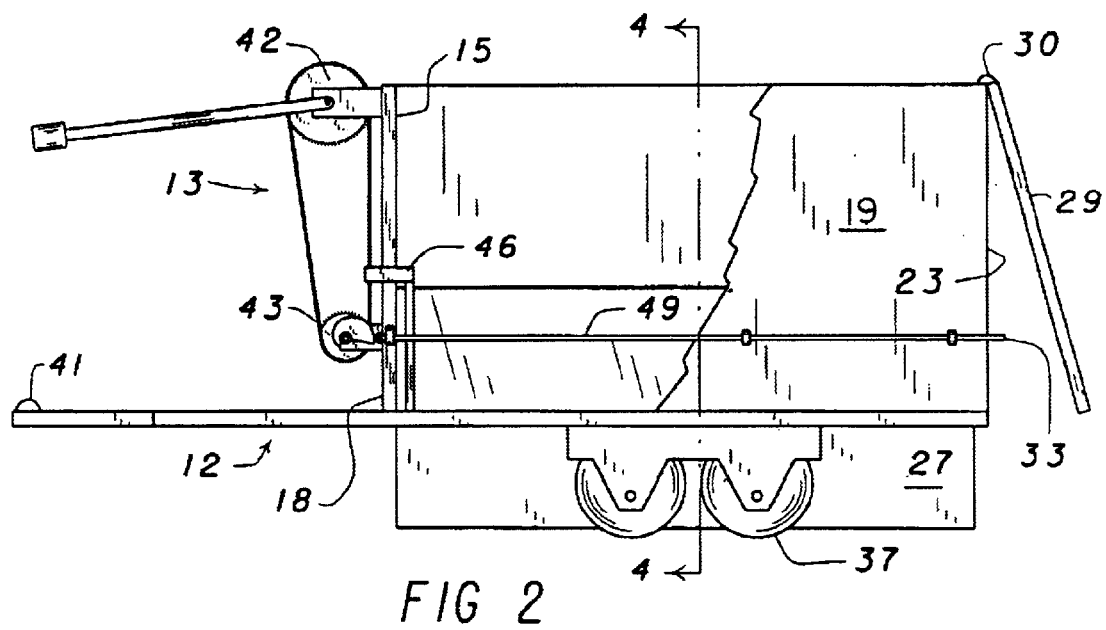
FIG. 2 shows the embodiment of FIG. 1 in the dumping state of operation.

When the latching means are controllably released from engagement with said rear wall, the rear wall becomes free swinging, and can move rearwardly and upwardly. This is a feature of the dumping state, as shown in FIGS. 2 and 4. In operation, when the cargo is allowed to fall by gravity effect directly upon the ground below the cart, a single pile is produced. The height of the pile may well be above the level of floor 24. Consequently, the pivotable nature of the unlatched rear wall permits rearward and upward motion by contact with the top of the pile when the cart is advanced. By virtue of such effect and the nature of the cargo, forward motion of the cart will not be impeded by the dumped pile. Typical cargos suitable for handling by the cart of this invention include top soil, manure, hay, feed and agricultural products.

Tandem wheel assemblies 11 are positioned below each sidewall. Each wheel 37 is rotatable upon an individual axle 38 within a holding yoke 39 in a manner such that no axle spans the cart below the cargo compartment. By virtue of said individual axles and consequent absence of a spanning axle, there is no obstruction to a dumped pile of cargo. Accordingly, the cart can be advanced over the pile. Said wheel assemblies are positioned in a manner such that panels 27, when in the dumping state as shown in FIG. 4, protect the wheels from interaction with the pile of dumped cargo. Such protection of the wheels in the dumping state is further achieved by virtue of the fact that the width of panels 27, measured between distal extremity 28 and supporting edge 26 is substantially equal to the distance between floor 24 and the receiving ground surface 57.

Tongue assembly 12 extends forwardly from front wall 14 adjacent lower extremity 18 thereof. The forward extremity of said tongue assembly contains hitching means 41 for releasable attachment to a towing vehicle.

Operating means 13, attached to exterior surface 16 of front wall 14 is shown comprised of upper and lower sprocket wheels 42 and 43, respectively, interconnected by sprocket drive chain 44. A lever 45 attached to said upper wheel 42 is adapted to facilitate manual turning of said wheel by about ¼ to ½ revolution. An operating stud 46 is attached to chain 44, and extends through vertically elongated slot 56 in front wall 14. Said stud secures bifurcated tether cable 47 that is attached to the distal extremities 28 of panels 27 at a location adjacent front wall 14. In operation, when lever 45 is pushed downwardly, cable 47 is pulled upwardly, causing the distal extremities of panels 27 to be lifted upwardly to intercontacting abutment, thereby producing the closed or transport state of the cart. A locking mechanism may be provided to secure lever 45 in fixed position.

When lever 45 is released, permitting upward movement thereof, the weight of panels 27 plus the weight of the cargo causes said panels to swing downwardly to dump the cargo.

Coupling rod 49 is interactive between cam 51 associated with lower sprocket wheel 43, and latching means 33 having pivoted hinge 52. A roller 53 is associated with the forward extremity of rod 49 to permit activation by cam 51. Forced downward movement of lever 45 produces movement of chain 44, cam 51 and rod 49 in the directions indicated by the arrows in FIG. 7. This causes hinge 52 to secure said rear wall. Simultaneously, panels 27 are pulled upwardly to their closed state. Upward movement of lever 45 produces a corresponding reverse effect, namely simultaneous release of rear wall 29 to its free-swinging condition, and release of panels 27 to their downwardly directed open state. Spring biasing means may be employed to drive rod 49 forwardly to produce said open state.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

What is claimed is:

1. A bottom dump trailer cart comprising:
    a) a cargo compartment defined by a front wall, paired sidewalls, a rear wall adapted to swing rearwardly and upwardly, and a floor having a pair of pivotably supported dumping panels adapted to swing downwardly in the direction of said sidewalls to a dumping state which permits gravity discharge of the contents of the compartment,
    b) latching means having a hinge pivotably secured to a sidewall for controllably preventing movement of said rear wall,
    c) at least one wheel positioned below each sidewall at a location that receives said panels in the dumping state, said wheels adapted to rotate in vertical planes parallel to said sidewalls,
    d) a tongue assembly extending forwardly of said front wall and having means for releasable attachment to a towing vehicle, and
    e) operating means associated with said tongue assembly for causing simultaneous movement of said panels and latching means to produce said dumping state wherein said rear wall is unlatched, and to produce a closed, transport state wherein said panels are upwardly drawn to intercontacting abutment, and said rear wall is secured in upright position by said latching means said simultaneous movement being achieved by a horizontally elongated coupling rod interactive between said operating means and said hinge.

2. The trailer cart of claim 1 wherein said front wall is bounded by interior and exterior surfaces and upper and lower extremities.

3. The trailer cart of claim 2 wherein said sidewalls are joined to said front wall in opposed, equally spaced relationship about a longitudinal axis that extends between said front and rear walls.

4. The trailer cart of claim 3 wherein said sidewalls extend to upper borders which are straight, parallel and horizontally coplanar, and further extend to vertically oriented rear extremities.

5. The trailer cart of claim 4 wherein said rear wall is supported by pivot means associated with the upper borders of said sidewalls, said pivot means permitting rearward and upward swinging movement of said rear wall.

6. The trailer cart of claim 5 wherein each wheel is rotatably mounted upon an individual axle.

7. The trailer cart of claim 6 wherein said wheels are positioned in a manner such as to be protected from the discharged contents of the compartment by said dumping panels.

8. The trailer cart of claim 2 wherein said operating means is comprised of upper and lower sprocket wheels associated with the exterior surface of said front wall and interconnected by a drive chain interactive with said dumping panels and latching means.

* * * * *